United States Patent [19]
Cauffiel

[11] 3,949,633
[45] Apr. 13, 1976

[54] SLITTER LINE

[76] Inventor: Ford B. Cauffiel, 1400 Hasting St., Toledo, Ohio 43607

[22] Filed: Aug. 19, 1974

[21] Appl. No.: 498,600

[52] U.S. Cl. .................. 83/210; 83/255; 83/282; 83/364; 83/408; 83/484; 83/488
[51] Int. Cl.² ........................................... B26D 5/38
[58] Field of Search ............. 83/209, 210, 212, 213, 83/214, 255, 282, 404, 408, 484, 487, 488, 489, 519, 555, 559, 614, 471.2, 364, 367, 370

[56] References Cited
UNITED STATES PATENTS

| | | | |
|---|---|---|---|
| 1,003,679 | 9/1911 | Welch | 83/255 |
| 1,340,137 | 5/1920 | Pfister | 83/408 X |
| 1,631,927 | 6/1927 | Dietrich | 83/488 X |
| 3,463,040 | 8/1969 | Pouilloux | 83/487 X |
| 3,566,932 | 3/1971 | Papenmeier | 83/471.2 |
| 3,621,743 | 11/1971 | Feighery et al. | 83/408 |
| 3,768,349 | 10/1973 | Cauffiel | 83/209 X |
| 3,777,608 | 12/1973 | Kopf et al. | 83/519 X |
| 3,830,128 | 8/1974 | Cochran et al. | 83/519 X |

Primary Examiner—J. M. Meister
Assistant Examiner—Fred A. Silverberg
Attorney, Agent, or Firm—Allen D. Gutchess, Jr.

[57] ABSTRACT

Apparatus for slitting large metal sheets of substantial length and width is provided. The apparatus includes a slitting machine of the throatless type guided on a track to provide precise slitting of the sheet. The apparatus includes a long hold-down clamp mounted adjacent the slitter and the track. A supporting table is located on the side of the hold-down clamp opposite the slitter and the track and is provided with measuring heads which enable the sheet which is to be slit to first be cut to a precise, given length. Two measuring heads are provided, one of which causes the sheet to slow down and the second which actuates a shear. A lower supporting table is located on the side of the slitter opposite the clamp and both tables are provided with gauge heads for accurately positioning the sheet prior to being clamped and slit. Preferably, a double slit is made along the desired line to substantially avoid distortion of the metal sheet along the slit.

8 Claims, 18 Drawing Figures

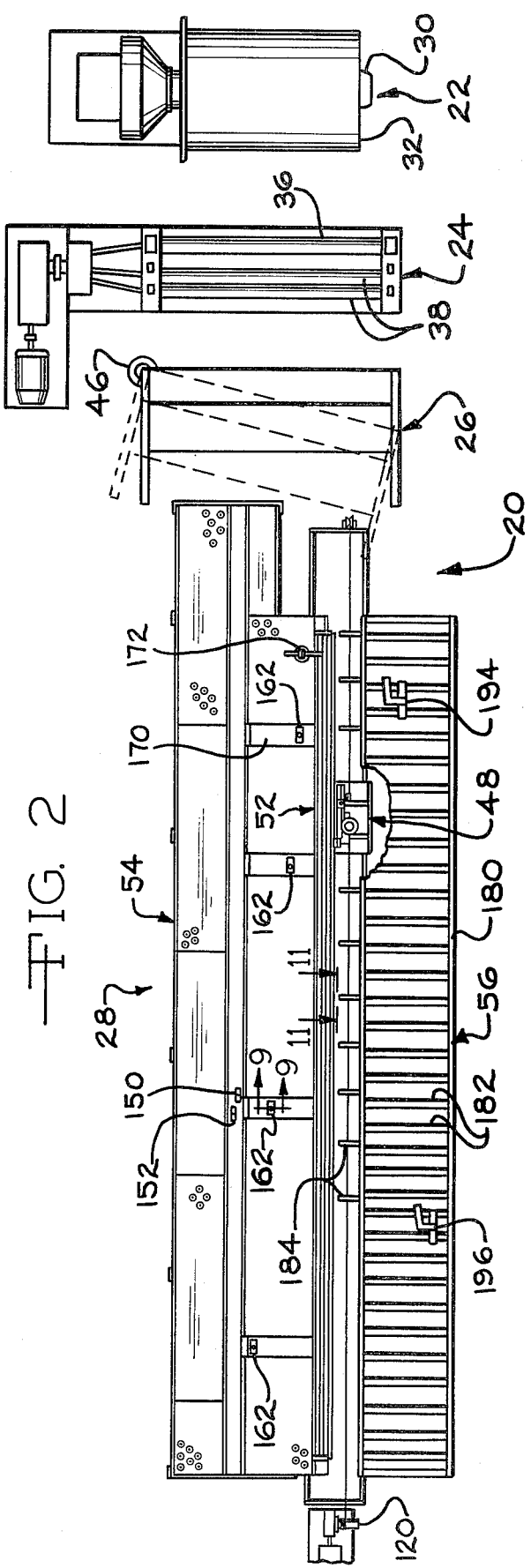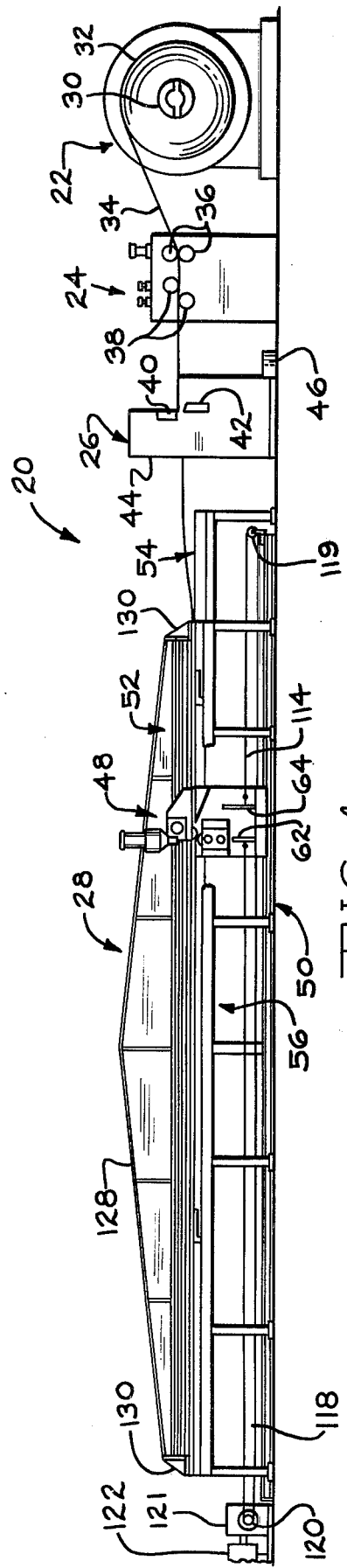

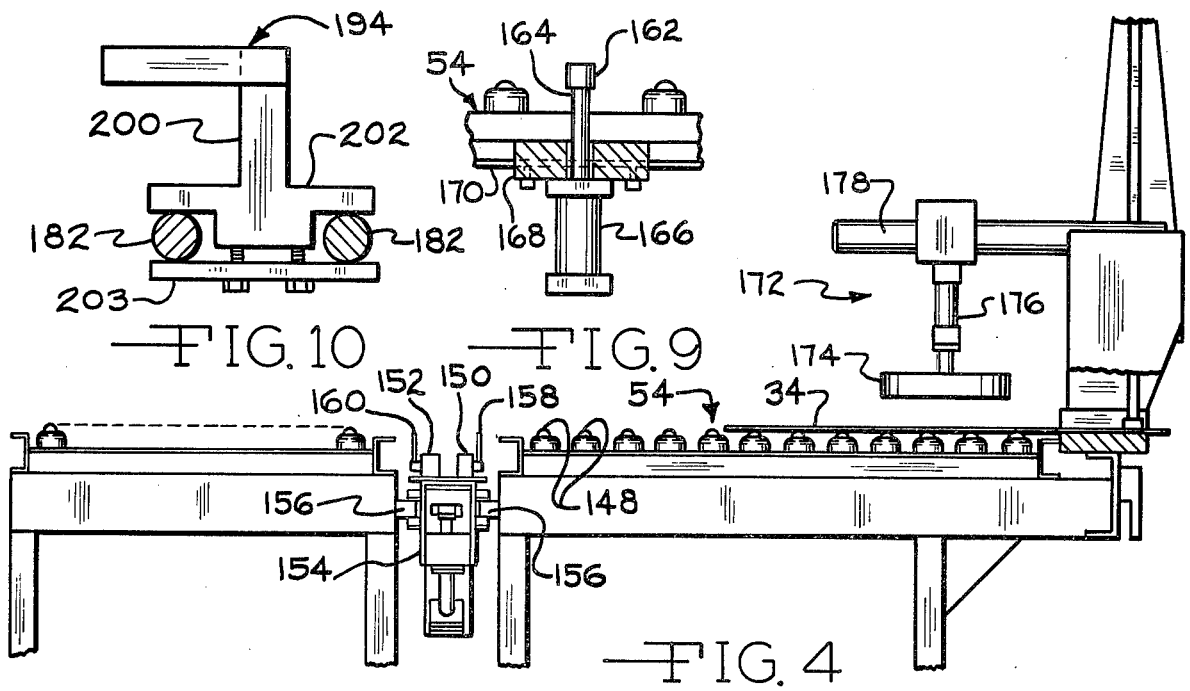
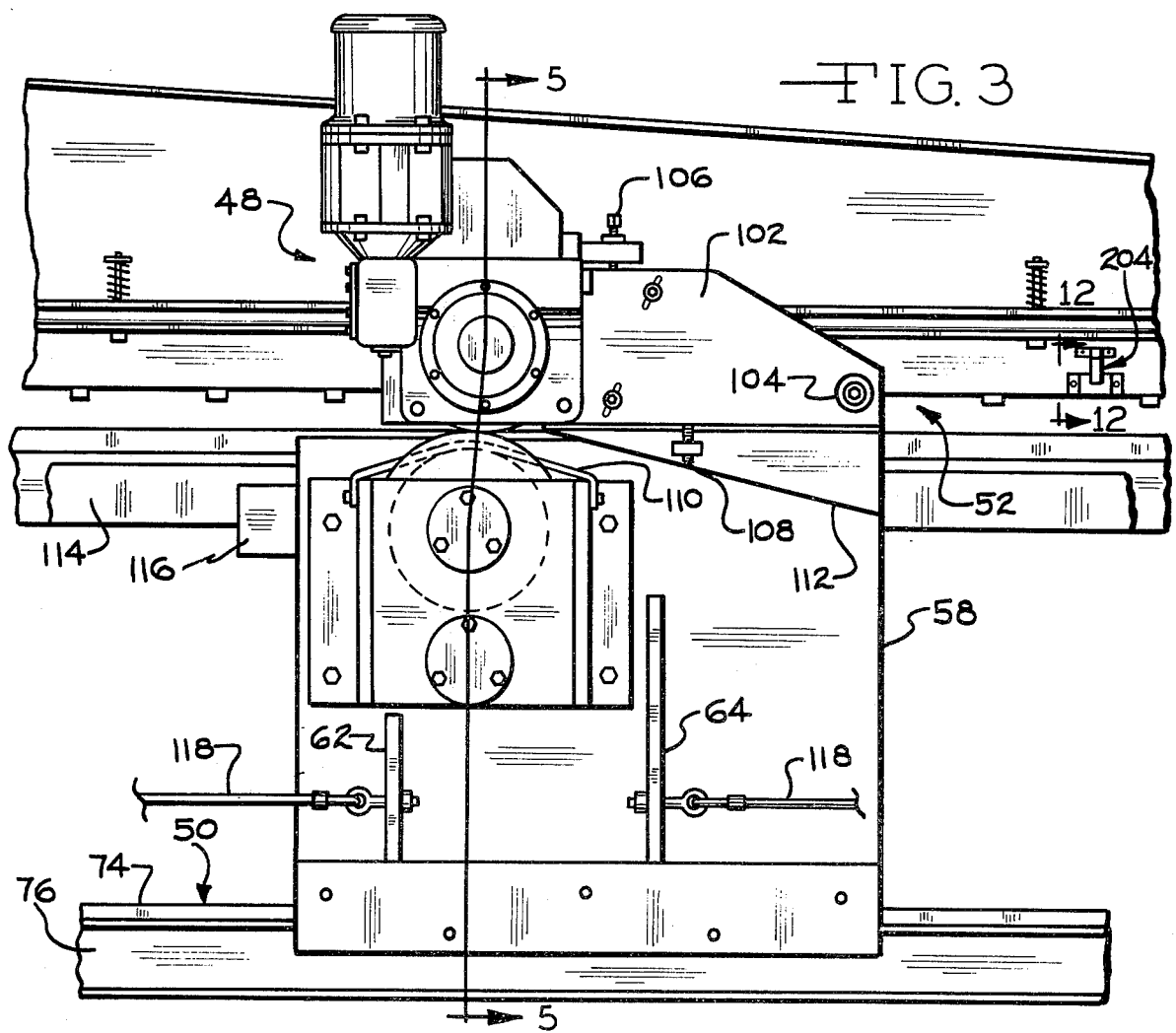

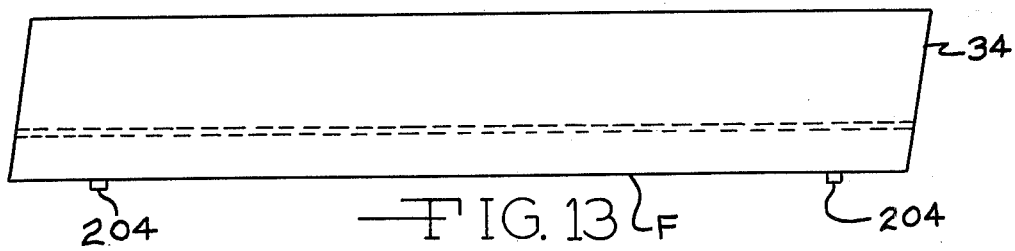
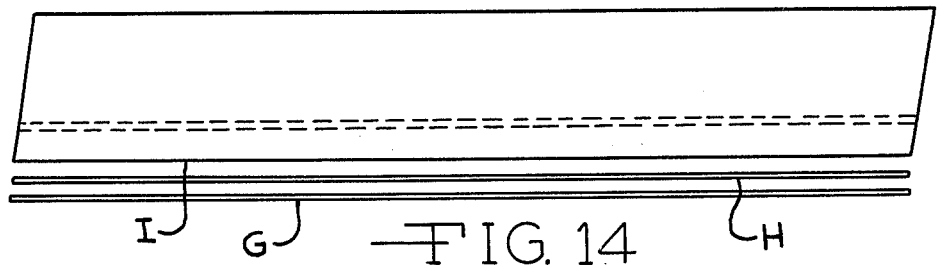
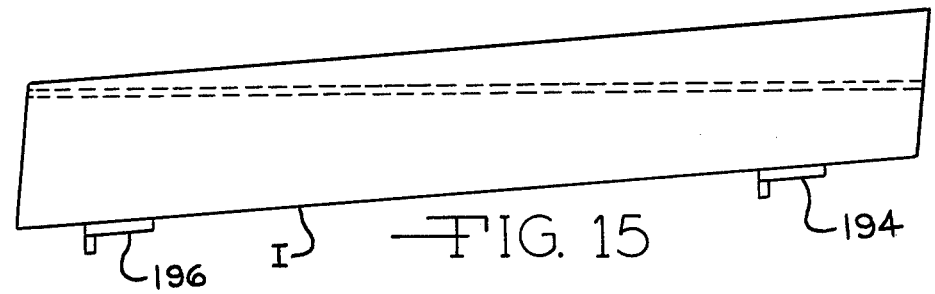
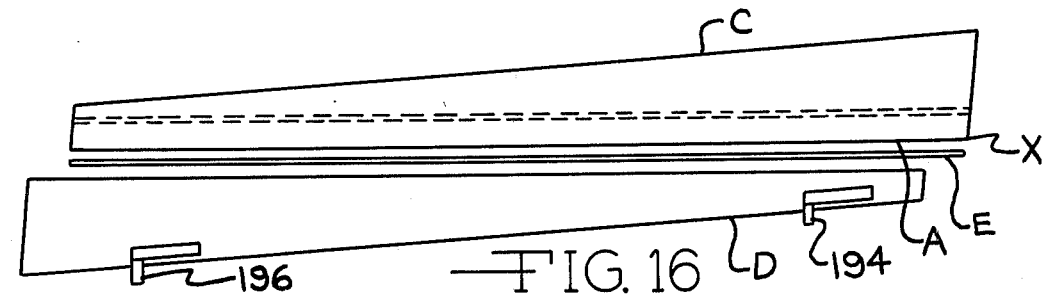
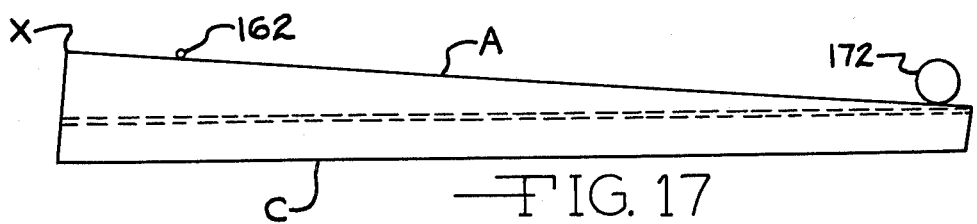
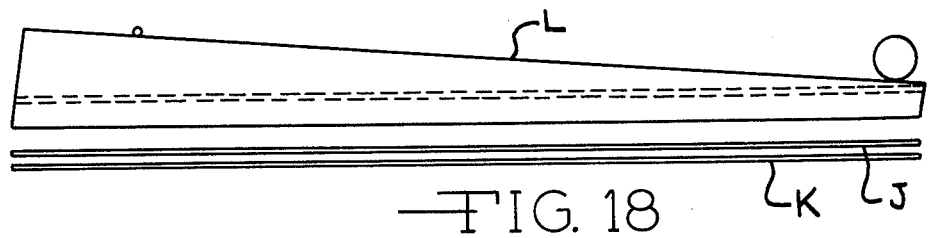

SLITTER LINE

This invention relates to a slitter line for accurately slitting large sheets of metal to desired sizes and shapes.

The new slitter line includes a slitting device of the throatless type which preferably makes a double slit in the metal to avoid distortion of the sheet along the slit. The throatless slitter requires no supports which otherwise limit the size and specifically the width of the sheet to be cut. The slitter is mounted on a frame which was guided along a track which can be of substantially any length so that the sheet to be slit can be of almost any conceivable length and width. A long hold-down clamp extends substantially the entire length of the track to maintain the sheet in a precise position during slitting.

The slitter line also includes an upper supporting table located adjacent the clamp on the side opposite the slitter and the track. The table is equipped with two measuring heads, the first of which slows down the sheet when the forward edge thereof contacts the head as the sheet is fed onto the table along a path parallel to the slitter track. The second measuring head actuates a shear upstream of the table to shear the sheet to length when the forward edge reaches the second head. Various gauge heads are also provided to accurately position the sheet transversely after it is cut to length and when it is to be slit to the desired size and shape. A lower supporting table is located adjacent the slitter and track on the side opposite the clamp with this table also being equipped with gauge heads. Finally, the overall line includes the shear upstream of the upper supporting table with this shear being pivotally mounted to enable the sheet to be cut at an angle so that the final sheet has forward and rearward edges located in a desired angular relationship relative to the slit made therein. Upstream of the shear is a straightener and beyond that is a coil support for rotatably supporting a coil of sheet material, such as steel, which is to be processed on the line.

It is, therefore, a principal object of the invention to provide a slitter line capable of slitting and cutting to length large sheets of metal.

Another object of the invention is to provide a slitter line capable of slitting long and wide sheets along precisely controlled lines.

A further object of the invention is to provide a slitter line in which a metal sheet is slit along two adjacent lines to avoid distortion of the sheet.

Yet another object of the invention is to provide an improved throatless slitter line having a greater versatility than slitters heretofore known.

Many other objects and advantages of the invention will be apparent from the following detailed description of a preferred embodiment thereof, reference being made to the accompanying drawings, in which:

FIG. 1 is a somewhat schematic side view in elevation of a slitter line according to the invention;

FIG. 2 is a somewhat schematic plan view of the line of FIG. 1;

FIG. 3 is an enlarged side view in elevation of a portion of the slitter line of FIGS. 1 and 2 and particularly showing a throatless slitter and track;

FIG. 4 is an end view in elevation of an upper supporting table, and measuring and gauge heads, and a hold-down clamp of the slitter line;

Figure 5:
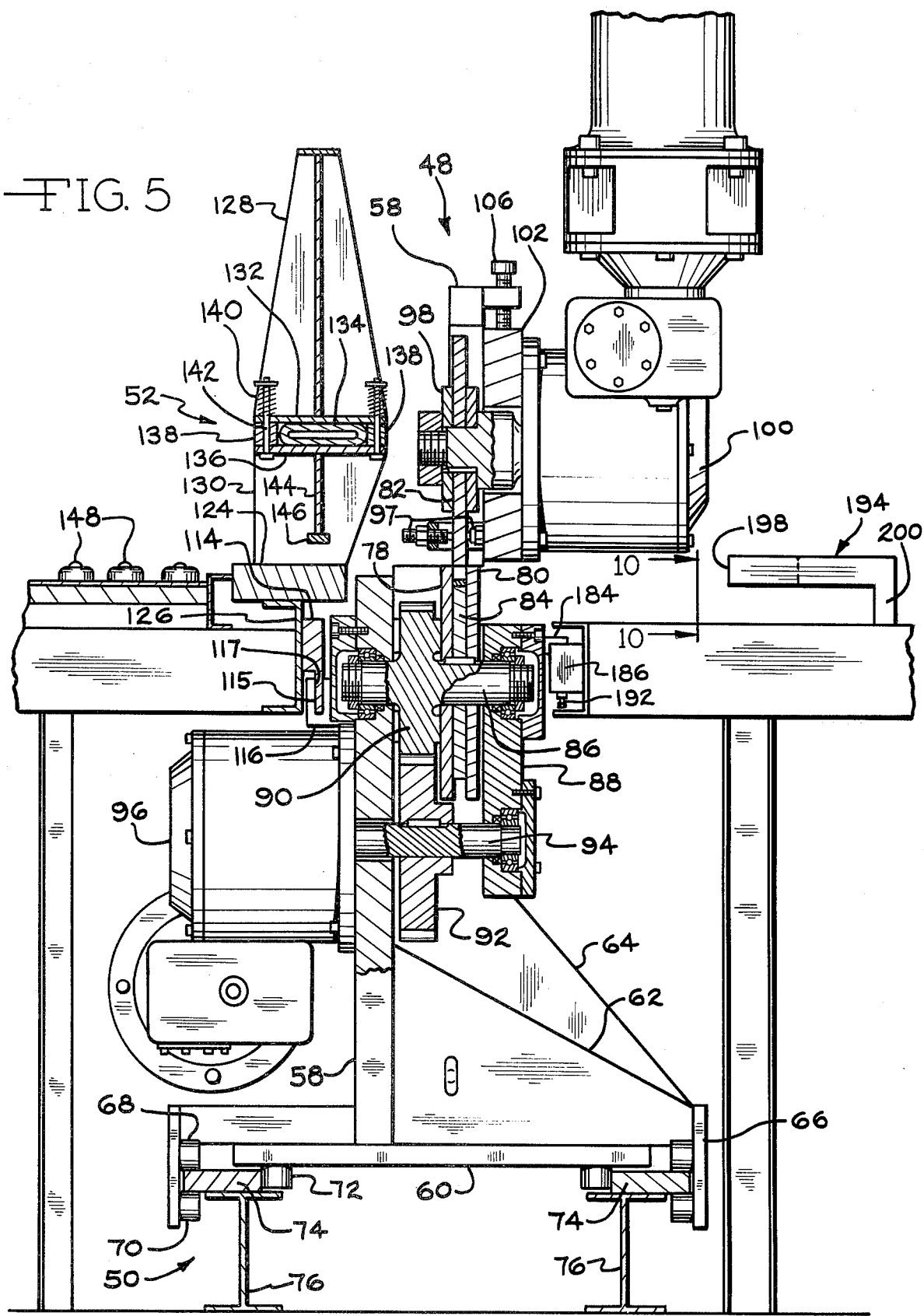
FIG. 5 is a further enlarged view taken generally along the line 5—5 through the slitter, track, and hold-down clamp of FIG. 3.
Figure 6:
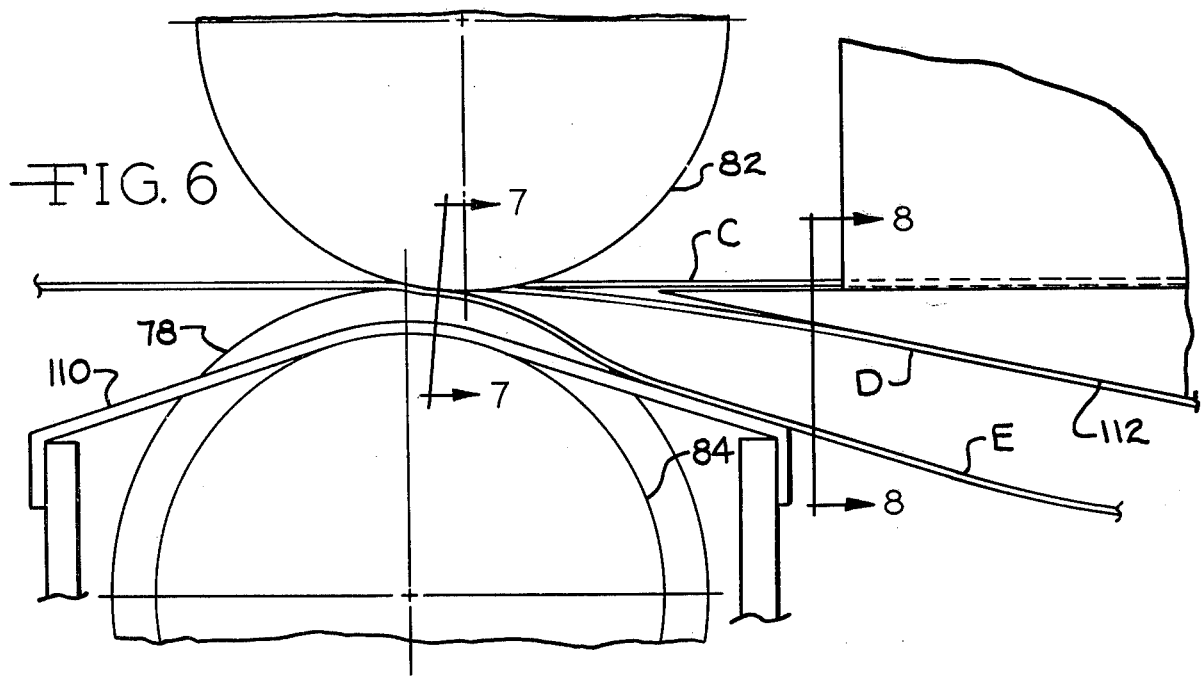
FIG. 6 is a further enlarged, fragmentary side view in elevation of certain elements of the throatless slitter.
Figure 7:
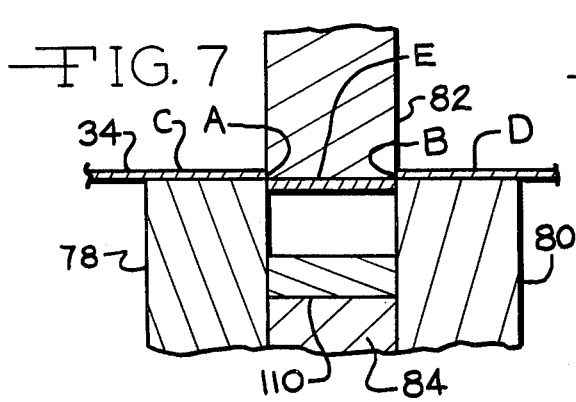
Figure 8:
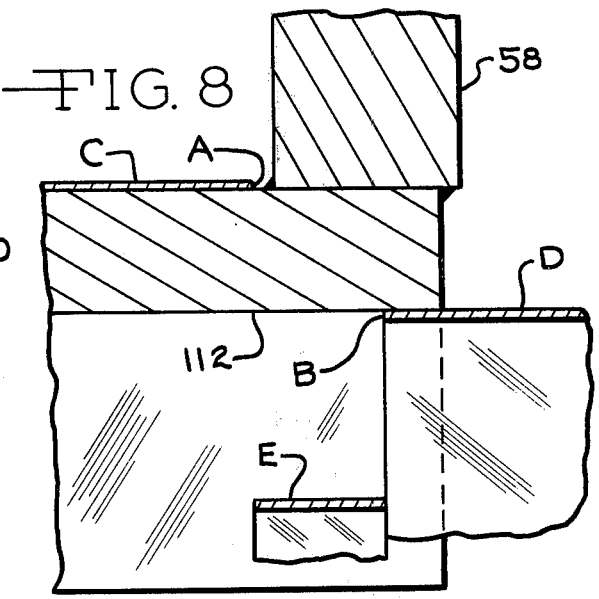
Figure 12:
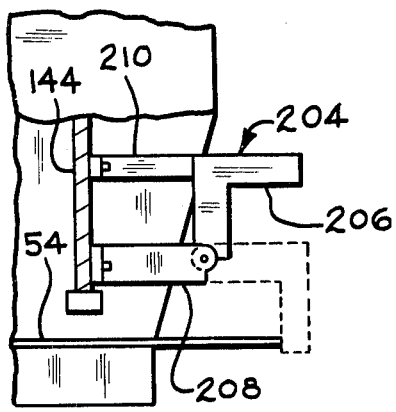
Figure 11:
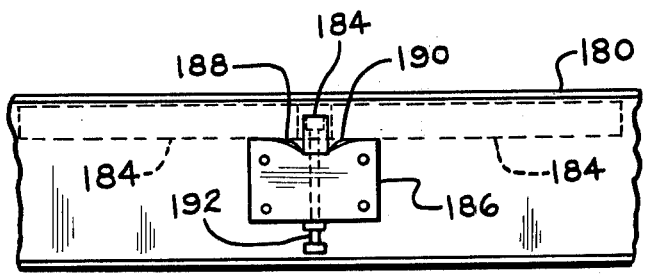

FIGS. 7 and 8 are views in transverse cross section taken along the lines 7—7 and 8—8 of FIG. 6;

FIG. 9 is a schematic view of a gauge head taken along the line 9—9 of FIG. 2;

FIG. 10 is a somewhat schematic view of another gauge head, taken along the line 10—10 of FIG. 5;

FIG. 11 is a detailed view of a pivoted supporting bar taken along the line 11—11 of FIG. 2;

FIG. 12 is a detailed view of a stop member taken along the line 12—12 of FIG. 3; and FIGS. 13–18 are schematic views showing the steps undertaken in slitting and processing a sheet.

Referring to the drawings, and particularly to FIGS. 1 and 2, a slitter line embodying the invention is indicated at 20. The line basically includes a source of sheet material indicated at 22, a flattener component 24, a shear 26, and a slitting assembly 28.

The source 22 includes an arbor 30 on which is supported a coil 32 of sheet material 34.

The main drive for the sheet 34 is achieved through a pair of pinch rolls 36 of the flattener 24. The sheet then passes between upper and lower rolls 38 in an undulating manner to straighten the sheet to remove the curve resulting therein from being wound on the coil 32.

The straightened sheet 34 then passes between upper and lower shearing blades 40 and 42 of the shear 26, which is of a substantially conventional design. However, the entire shear frame 44 is slidably mounted on the floor and is movable in an arcuate path around a pivot 46. With this arrangement, the shear blades can be positioned in any desired manner relative to the sheet 34 to shear the front and rear edges of the sheet at any desired angle. Thus, the edges can be cut perpendicular to the longitudinal extent of the sheet or perpendicular to slits made in the sheet, by way of example.

The slitter assembly 28 includes a throatless slitter 48 mounted on a track 50, a long hold-down clamp 52, an upper supporting table 54, and a lower supporting table 56.

The throatless slitter 48 (FIGS. 3 and 5) has a main upstanding frame 58 extending upwardly from a base 60 and supported through suitable braces 62 and 64. The base 60 has side plates 66 carrying upper and lower rollers 68 and 70 with the base 60 also having depending rollers 72. These sets of rollers cooperate with upper and lower surfaces and inner edges of track rails 74 which are mounted on I-beams or other suitable beams 76 of the track 50. The rails are precisely positioned and cooperate closely with the rollers 68, 70, and 72 to accurately guide the throatless slitter 48 along the track 50.

In the preferred form, the throatless slitter actually makes two slits or cuts in the sheet metal to prevent distortion thereof along the cut edge, particularly in the case of thicker sheets. For this purpose, the slitter has two lower slitting wheels 78 and 80 and an upper slitting wheel 82 having edges which cooperate with the inner edges of the lower wheels 78 and 80 to provide the two slits or shear lines for the sheet material being slit. The lower wheels are spaced apart by a center spacing disc 84 with the three being mounted on a lower stub shaft 86 having one end supported by the upstanding frame 58 and the other end rotatably carried in an outboard plate 88. A gear 90 on the shaft 86 meshes with a gear 92 on a lower drive shaft 94 having an outer end also rotatably carried by the plate 88 and the other end extending through the frame 58 to a lower drive unit indicated at 96 mounted on the opposite side of the frame 58. Thus, the lower slitting wheels 78 and 80 are driven through the lower drive unit 96.

The upper slitting wheel 82 is transversely supported by two back-up screws 97 positioned on each side of the wheel 82, as shown in FIG. 5. This wheel is mounted on a drive shaft 98 which is connected directly to an upper drive unit 100 mounted on an upper frame member 102 on the side opposite the wheel 82. The upper wheel 98 is thereby driven by the drive unit 100 independently of the lower wheels 78 and 80 so that they can be driven at different speeds, if desired.

The upper frame member 102 is pivotally connected to an upper portion of the frame 58 by a rear pivot 104 (FIG. 3) and upper and lower screw adjustments 106 and 108 are effective to raise and lower the upper slitting wheel 82 relative to the lower wheels, although it is always slightly to the rear of them, as shown in FIG. 3. As shown in FIG. 7, the upper wheel 82 is approximately tangential to the lower wheels 78 and 80 to provide the proper shearing force for the sheet material 34.

Two slits designated A and B (FIGS. 6–8) made by the wheels form two main pieces C and D from the sheet 34 and also a narrow, intermediate strip E. The strip E prevents distortion of either of the severed pieces C and D so that a smooth edge is obtained at both of the slits A and B. The intermediate strip E is carried over and above the spacing disc 84 by a somewhat resilient ejection strip or bar 110. The piece D is directed downwardly below a pie-shaped web 112 which connects the lower and upper portions of the main frame 58.

To further precisely control the slit of the sheet material 34, the supporting table 54 has a guide rail 114 (FIG. 5) with a depending flange 115 mounted thereon immediately below the hold-down clamp 52. A guide bracket 116 with a central slot 117 cooperates with the depending flange 115 to firmly position the throatless slitter 48 with respect to the hold-down clamp 52 and the edge A of the sheet portion C held by the clamp.

The rotation of the slitter wheels 78, 80, and 82 moves the slitter 48 along the sheet material 34 as the slits are being made. However, to return the slitter 48 to the forward or charge end of the table 54 near the shear 26 when the slits are completed, the track 50 is provided with a cable 118 (FIGS. 1 and 3). This cable is connected to the brace 64 and extends around a pulley 119 toward the charge end of the slitter assembly 28. The cable then extends around a winch drum 120 at the opposite end of the track and back to the brace 62. The cable has two or more wraps around the winch drum 120 which is driven through a gear reducer 121 by a suitable motor 122 and preferably through a slip clutch (not shown).

The hold-down clamp 52 can be of the type shown in a co-pending application of Cauffiel et al, Ser. No. 414,373. Referring particularly to FIGS. 1 and 5, the hold-down clamp includes a lower clamping bar 124 extending the length of the path of the throatless slitter 48 and mounted on an upper edge portion of a frame member 126 of the table 54. A long stiffening beam 128 extends above the clamping bar 124 and is suitably supported by end brackets 130. Immediately below a lower flange 132 of the stiffening beam is a flexible tube 134 forming a fluid passage which expands when filled with fluid under pressure from a suitable source (not shown). The tube 134 is positioned on a supporting plate 136 spaced from the flange 132 by side spacing bars 138 and urged upwardly by coil springs 140 located on the upper ends of long bolts 142 which extend through the plate 136, the bars 138, and the flange 132. A vertical stiffening plate 144 is affixed to and depends from the plate 136 and terminates in a plurality of upper hold-down or clamping pads 146 spaced along the length of the lower clamping member 124. The hold-down clamp 52 is effective to engage and securely hold any size of the sheet 34 up to the distance between the end brackets 130. The sheet is firmly and precisely held while the throatless slitter 48 operates over the length of the sheet. The cooperation of the guide members 114 and 116 also assures a constant position between the slitter and the hold-down clamp.

The upper supporting table is equipped with a multiplicity of transfer balls 148 which facilitate moving and positioning the sheets 34 thereon and also eliminates the possibility of scratching or marring of the lower surface of the sheets. As shown particularly in FIG. 4, the table 54 is equipped with two measuring heads 150 and 152 mounted on a housing 154. The housing 154 is supported on and movable along tracks 156 extending over a substantial portion of the length of the table 54 so that the heads 150 and 152 can be placed in any desired positions to determine the length of the sheet 34 to be cut. The measuring heads have switch arms 158 and 160 extending upwardly above the plane of the transfer balls 148 so as to be engageable by the forward edge of the sheet 34 being moved down the table 54 by the pinch rolls 36. When the forward edge of the sheet engages the first switch arm 158, it reduces the speed of the pinch rolls 36 to reduce the forward speed of the sheet 34 substantially. When the sheet then engages the switch arm 160 of the measuring head 152, the pinch rolls 36 are stopped and the shear 26 is actuated to sever the sheet to the desired length. The sheet is then moved and positioned as desired on the table 54, the hold-down clamp 52 is then operated to engage the sheet and the slitter 48 is then operated to make the desired cut.

The upper supporting table 54 also is equipped with four gauge heads 162 which are both retractable and adjustable. The gauge heads are mounted on piston rods 164 connected to pistons in fluid-operated cylinders 166. These depend from adjustable supports 168 which are slidable along tracks 170. The tracks 170 are positioned perpendicular to the path of the slitter 48. An additional gauge head 172 (FIGS. 2 and 4) is located close to the hold-down clamp 52 so as to be more effective in positioning an edge portion of the sheet 34 close to the slitting line. The gauge head 172 includes a disc 174 mounted for vertical movement by a cylinder 176 which is movable transversely of the slitter path on a horizontal supporting post 178. The five gauges heads are necessary to accommodate sheets of various lengths, but only two are usually used at any given time.

The lower supporting table 56 includes a main frame 180 and a multiplicity of conveying rollers 182. Referring to FIGS. 2 and 11, the table 56 also has a plurality of supporting extension bars 184 extending from the side of the frame 180 toward the table 54 and transverse to the path of the slitter 48. The extension bars aid in holding the severed metal portion D and particularly the strip E after being severed from the main sheet 34. Since the extension bars 184 are in the path of the slitter 48, they must yield as the slitter moves along the path. For this purpose, the bars 184 are pivotally supported by the frame 180 on brackets 186 having sloping surfaces 188 and 190. As the forward portion of the slitter 48 contacts the bar 184, it is pivoted in a clockwise direction, as viewed in FIG. 2, up the slope 188 and out of the way of the slitter. After the slitter passes, the supporting bar 184 then swings back down the sloping surface 188 to the transverse position again. When the slitter 48 returns from its end position to its original position the members 184 are then moved up the rear sloping surface 190, in a counterclockwise direction as viewed in FIG. 2, returning to the original transverse position by gravity down the sloping surface 190 after the slitter has passed. The pivot for the bar 184 is achieved through a pivot rod 192 extending through the rear of the supporting bar 184 and suitably mounted between the frame 180 and the bracket 186.

Two gauge heads 194 and 196 are located on the table 56 in positions generally shown in FIG. 2, the gauge head 194 being shown more particularly in FIGS. 5 and 10. It includes a forward edge 198 positioned above the table 56 to contact an edge of the sheet 34. The gauge head 194 also includes a vertical spacing stem 200 mounted on a clamping bracket 202 which is supported on two adjacent ones of the rollers 182 and clamped in position by a bar 203 when adjusted to the desired transverse position relative to the slitter path.

To position the sheet 34 for the initial trim cut, at least two trim stops 204 are mounted on the frame member 144 of the hold-down clamp 52 as shown in FIG. 12. Each of the trim stops 204 includes an L-shaped member 206 pivotally mounted on a lower bracket 208 which is affixed to the member 144. In the retracted position, as shown in solid lines, the member 206 is held by a magnet 210. When swung to the lower, dotted line position, the stop member 206 is in the path of the sheet 34 to position it relative to the path of the slitter 48 for the initial trim cut.

The operation of the overall line will now be described in connection with FIGS. 13–18. In FIG. 13, the sheet 34 has been cut to the desired length and along the desired angles as determined by the pivotal position of the shear 26. The sheet 34 has then been positioned by an operator on the supporting table 54 with an edge F against the trim stops 204. The parallel dotted lines in this and the subsequent figures are representative of the area of the sheet 34 clamped by the hold-down clamp 52.

Referring to FIG. 14, the stops 204 are swung to their retracted positions and the slitter 48 then moves through its slitting path to produce a severed trim strip G and an intermediate strip H, leaving a finished trim edge I.

The hold-down clamp 52 is then released and the slitter 48 is returned to its original position with the trimmed edge I of the sheet moved against the gauge heads 194 and 196 above the table 56 (FIG. 15). The hold-down clamp 52 is then actuated once again, engaging the sheet along the area indicated by the dotted lines.

Referring to FIG. 16, the slitter is once again moved through its slitting path to form the severed sheet portion D (see also FIG. 7), the strip E, and the sheet portion C. At this time, the severed sheet portion D drops onto the table 56 and specifically on the rollers 182 and below the edges 198 of the gauges 194 and 196 so that it can be more easily removed. Referring to FIG. 17, with the sheet portion D removed, and the clamp 52 released, the remaining sheet portion C is turned end to end on the table 54 with a corner designated X in FIG. 16 being in a diagonally opposite position as indicated by X in FIG. 17. The newly severed edge A of the sheet portion C is then moved against the gauge heads 172 and one of the gauge heads 162. To accomplish this, the sheet portion C, after being turned end for end, is moved under the hold-down clamp 52 with the gauge head 172 then being lowered into the path of the sheet and the gauge head 162 being raised. The portion C is then moved back against the gauge heads and the hold-down clamp 52 actuated to engage the sheet along the area indicated in dotted lines. The slitter 48, which has once again been returned to its original position, is then operated again to form new trim strips J and K (FIG. 18) and provide a second finished sheet portion L. From this, it will be seen that the one cut-to-length sheet 34 of FIG. 13 in the shape of a parallelogram results, from the operation of the slitter line, into the two final tapered sheet portions or blanks D and L. These tapered blanks are then ready for fabrication into tapered poles or other desired products.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A line for slitting sheets into desired sizes and shapes, said line comprising a source of sheet material, means for moving a sheet of the material along a path, means for shearing the sheet to desired lengths, and a slitter assembly for slitting the sheared sheet along a line having a component of direction transverse to the sheared ends of the sheet, said slitter assembly comprising a slitter, guide means for guiding said slitter along a path having a length at least equal to the distance between the sheared ends of the sheet, hold-down means extending along one side of said guide means for holding said sheet while it is being slit by said slitter, a supporting table located adjacent said hold-down means on the side thereof opposite said slitter, at least two gauge heads, and means for mounting said gauge heads for movement transverse to the path of said slitter.

2. A line according to claim 1 characterized by at least one of said gauge heads having means for retracting said one head to an out-of-the-way point below the table.

3. A line according to claim 1 characterized by one of said gauge heads having means for moving said one head to an out-of-the-way position above said table.

4. A line for slitting sheets into desired sizes and shapes, said line comprising a source of sheet material, means for moving a sheet of the material along a path, means for shearing the sheet to desired lengths, and a slitter assembly for slitting the sheared sheet along a line having a component of direction transverse to the sheared ends of the sheet, said slitter assembly comprising a slitter having an upper slitting wheel and at least one lower slitting wheel, and means for independently driving each of said slitting wheels, guide means for guiding said slitter along a path having a length at least equal to the distance between the sheared ends of said sheet, and hold-down means extending along one side of said guide means for holding said sheet while it is being slit by said slitter.

5. A line according to claim 4 characterized by means for moving said slitter toward the end of said guide means nearer said shear from the opposite end of said guide means.

6. A line for slitting sheets into desired sizes and shapes, said line comprising a source of sheet material, means for moving a sheet of the material along a path, means for shearing the sheet to desired lengths, and a slitter assembly for slitting the sheared sheet along a line having a component of direction transverse to the sheared ends of the sheet, said slitter assembly comprising a slitter having an upper slitting wheel and two lower slitting wheels spaced apart a distance approximately equal to the thickness of said upper slitting wheel, guide means for guiding said slitter along a path having a length at least equal to the distance between the sheared ends of said sheet, and hold-down means extending along one side of said guide means for holding said sheet while it is being slit by said slitter.

7. A line for slitting sheets into desired sizes and shapes, said line comprising a source of sheet material, means for moving a sheet of the material along a path, means for shearing the sheet to desired lengths, and a slitter assembly for slitting the sheared sheet along a line having a component of direction transverse to the sheared ends of the sheet, said slitter assembly comprising a slitter, guide means for guiding said slitter along a path having a length at least equal to the distance between the sheared ends of said sheet, hold-down means extending along one side of said guide means for holding said sheet while it is being slit by said slitter, a supporting table on the side of said slitter opposite said hold-down means, and pivotable supporting bars extending from said supporting table toward said hold-down means in the path of said slitter.

8. A line for slitting sheets into desired sizes and shapes, said line comprising a source of sheet material, means for moving a sheet of the material along a path, means for shearing the sheet to desired lengths, and a slitter assembly for slitting the sheared sheet along a line having a component of direction transverse to the sheared ends of the sheet, said slitter assembly comprising a slitter, guide means for guiding said slitter along a path having a length at least equal to the distance between the sheared ends of said sheet, hold-down means extending along one side of said guide means for holding said sheet while it is being slit by said slitter, a supporting table on the side of said slitter opposite said hold-down means, and at least two gauge heads mounted on said table for movement transverse to the path of said slitter.

* * * * *